United States Patent [19]

Prudhomme

[11] Patent Number: 5,317,964
[45] Date of Patent: Jun. 7, 1994

[54] APPARATUS FOR REDUCING THE FAT CONTENT OF FRIED FOODS

[76] Inventor: Malcolm J. Prudhomme, 723 Caddo Dr., Opelousas, La. 70570

[21] Appl. No.: 974,708

[22] Filed: Nov. 12, 1992

Related U.S. Application Data

[63] Continuation-in-part of Ser. No. 821,751, Jan. 13, 1992, abandoned.

[51] Int. Cl.$^5$ .................... A47J 43/04; B01D 33/00
[52] U.S. Cl. .................... 099/495; 099/511; 210/369; 210/379; 210/380.1; 494/36; 494/56
[58] Field of Search .................. 099/403, 407, 409–415, 099/352, 353, 355, 357, 510–513, 495, 484; 34/58; 210/360.1, 380.1, 474, 477; 241/168, 169, 169.1; 134/157, 158, 162; 366/232, 234; 494/36, 56, 60

[56] References Cited

U.S. PATENT DOCUMENTS

| | | | |
|---|---|---|---|
| 3,200,737 | 8/1965 | Ferenc | 99/355 |
| 4,007,751 | 2/1977 | Commiant | 134/158 |
| 4,090,310 | 5/1978 | Koff | 34/58 |
| 4,523,993 | 6/1985 | Farber | 210/380.1 |
| 4,591,104 | 5/1986 | Bounds | 241/169.1 |
| 4,702,162 | 10/1987 | Sontheimer et al. | 99/495 |
| 4,873,920 | 10/1989 | Yang | 99/409 |
| 5,007,591 | 4/1991 | Daniels, Jr. | 241/169.1 |
| 5,010,805 | 4/1991 | Ferrara | 99/353 |
| 5,156,084 | 10/1992 | Lin | 99/511 |
| 5,184,544 | 2/1993 | Ling | 99/511 |

*Primary Examiner*—Timothy F. Simone
*Attorney, Agent, or Firm*—Hogan & Hartson

[57] ABSTRACT

The apparatus comprises a base unit, a rotatable shaft extending vertically from the base unit, a means for rotating the shaft, and a rotatable cylindrical basket capable of holding fried foods. The basket comprises an horizontally disposed circular bottom piece and a vertically disposed cylindrical piece of porous material being attached at its lower open end to the outer edge of the circular bottom piece to form the vertical wall of the basket. The basket is vertically connectible to and removable from the rotatable shaft. The apparatus further comprises a means for coupling the rotatable shaft to the rotatable basket so that the axis of the shaft is aligned with the axis of the basket. The apparatus also comprises a solid vertical wall surrounding the porous vertical wall of the rotatable basket. The solid vertical wall has an annular channel on the inside of its lower edge so that it has a substantially J-shaped cross section. The solid vertical wall is vertically mountable on the removable from the apparatus so that the height of the circular bottom piece of the basket relative to the base unit is greater than or equal to the height of the upper edge of the annular channel of the solid vertical wall relative to the base unit. The inner edge of the annular channel is spaced apart from and outside of the outer edge of the circular bottom piece of the basket. The apparatus further comprises a solid removable lid.

7 Claims, 3 Drawing Sheets

APPARATUS FOR REDUCING THE FAT CONTENT OF FRIED FOODS

CROSS-REFERENCE TO RELATED APPLICATIONS

This is a continuation-in-part of application Ser. No. 07/821,751 filed Jan. 13, 1992, now abandoned.

BACKGROUND OF THE INVENTION

1. Field of the Invention

This invention relates generally to apparatus for reducing the fat content of fried foods by high speed centrifugal separation of the oil from the fried food. This invention also relates to a process for reducing the fat content of different types of fried foods.

2. Description of the Prior Art

It is generally recognized that a diet having a high fat content is not desirable. Fried foods are generally considered to have a high fat content because there is no efficient method for removing the cooking oil from the surface of the food once frying has been completed. A number of devices have been described which combined both the frying of foods in a heated cooking oil and then the separation of the cooking oil from the fried foods using centrifugal means. Such devices are disclosed, for example, in U.S. Pat. Nos. 3,200,737, 4,873,920 and 5,010,805.

In U.S. Pat. Nos. 3,200,737 and 5,010,805, cooking devices are disclosed in which a food to be fried is placed within a porous container which is lowered into the hot cooking oil. After the cooking is completed, the porous container is raised above the level of the cooking oil and then the container is manually spun to cause the cooking oil to separate from the surface of the fried food product. In U.S. Pat. No. 4,873,920, a device is disclosed in which raw materials in a portable container unit are lowered into hot frying oil in a frying compartment and fried under low pressure or vacuum. The container is rotated by a motor at low speed during the frying period. After the frying oil has been withdrawn from the frying compartment, the container is rotated at relatively high speed to separate the absorbed oil from the fries under the same low pressure.

In U.S. Pat. No. 4,702,162, a salad spinner dryer attachment for a food processor is disclosed which reduces the speed of the electric motor in the food processor base so that the salad greens are not damaged by spinning at high speed. The attachment includes an outer bowl which is mounted on the base and a perforated or slotted basket for holding the wet salad greens which is mounted so that it will rotate within the bowl. Wheels in the outer bowl are positioned between the basket and the drive shaft of the motor to reduce the speed.

SUMMARY OF THE INVENTION

In accordance with the present invention, an apparatus for reducing the fat content of fried foods is disclosed which comprises a base unit for supporting the apparatus, a rotatable shaft extending vertically from the base unit, a means for rotating the shaft at speeds, for example, between about 600 and 1500 RPM, and a rotatable cylindrical basket capable of holding fried foods. The basket comprises an horizontally disposed circular bottom piece and a vertically disposed cylindrical piece of porous material which is attached at its lower open end to the outer edge of the circular bottom piece to form the vertical wall of the basket. The porous material must be sufficiently porous to permit oil from the fried food to pass through it readily. The basket is vertically connectible to and removable from the rotatable shaft.

The apparatus further comprises a means for coupling the rotatable shaft to the rotatable basket so that the axis of the shaft is aligned with the axis of the basket. The rotatable shaft may be coupled directly to the rotatable basket. Alternatively, the shaft may be coupled to the basket by means of a vertically disposed, cylindrically shaped frame attached to the shaft so that the axis of the shaft is aligned with the axis of the frame.

The apparatus also comprises a solid vertical wall surrounding the porous vertical wall of the rotatable basket. The solid vertical wall has an annular channel on the inside of its lower edge so that it has a substantially J-shaped cross section. The solid vertical wall is vertically mountable on and removable from the apparatus so that the height of the circular bottom piece of the basket relative to the base unit is greater than or equal to the height of the upper edge of the annular channel of the solid vertical wall relative to the base unit. The solid vertical wall may be directly mountable on and removable from the base unit. Alternatively, the solid vertical wall may be mountable on and removable from a housing which surrounds the solid vertical wall and is attached to the base unit. The inner edge of the annular channel is spaced apart from and outside of the outer edge of the circular bottom piece of the basket. In addition, the apparatus comprises a solid removable lid for closing the upper open end of the solid vertical wall and enclosing the basket within the apparatus.

In accordance with a further aspect of the present invention, a method for reducing the fat content of fried food is disclosed. The method comprises the placing of fried foods, such as vegetables, meat and fish, in a sufficiently porous container and then subjecting the fried food to centrifugal force by rotating the porous container at certain defined speeds and periods of time depending upon the particular fried food product being processed.

In order to reduce the fat content of fried vegetables such as French fried potatoes, the fried vegetables are placed in the porous container and subjected to centrifugal force by rotating the container at a speed in the range of from about 1120 RPM to about 1470 RPM for a period of about 45 seconds to about 60 seconds.

In accordance with the process for reducing the fat content of fried meat such as fried chicken or hamburger, the fried meat is placed in a porous container and subjected to centrifugal force by rotating the container at a speed in the range of from about 800 RPM to about 1050 RPM for a period of from about 45 seconds to about 60 seconds.

In the process for reducing the fat content of fried fish, the fried fish is placed in a porous container and subjected to centrifugal force by rotating the container at a speed in the range of from about 600 RPM to about 788 RPM for a period of from about 45 seconds to about 60 seconds.

DETAILED DESCRIPTION OF THE PREFERRED EMBODIMENTS

Figure 1:
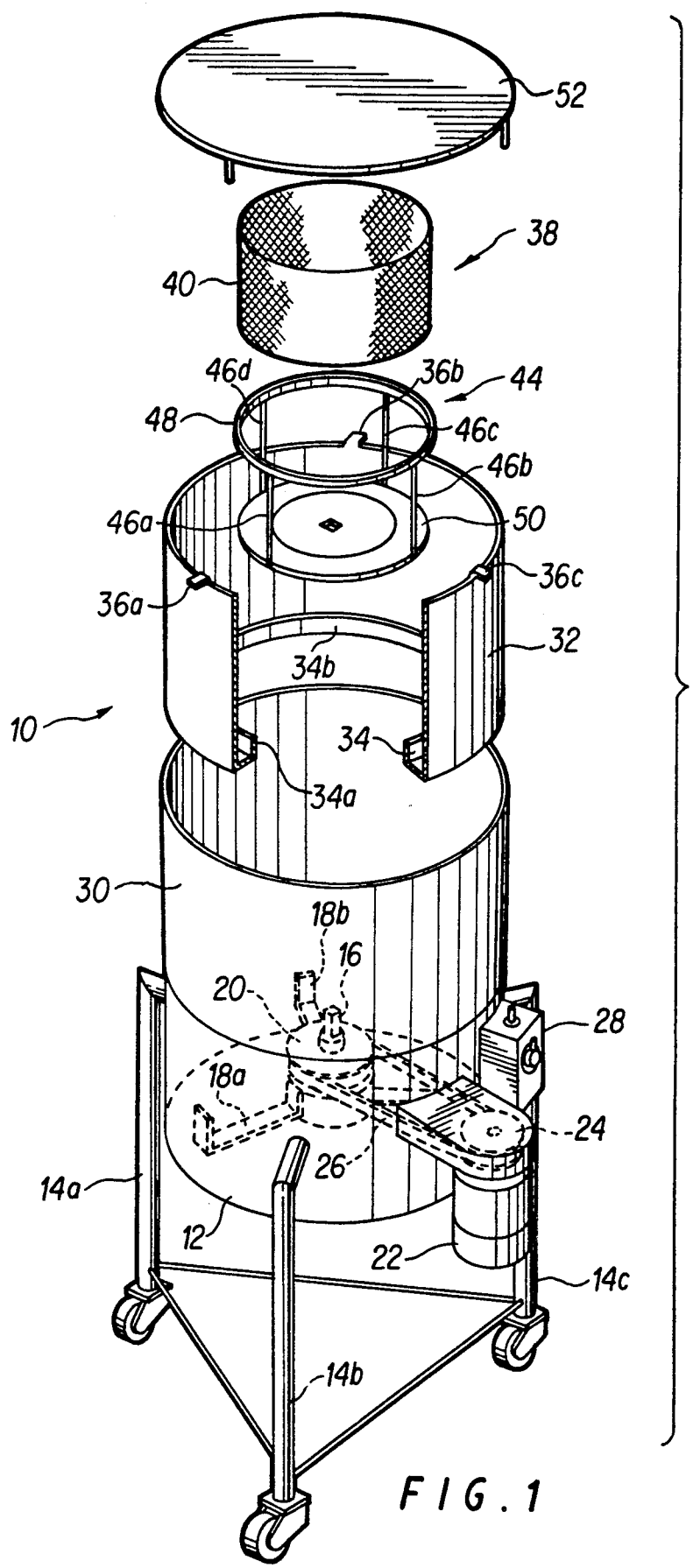
FIG. 1 is an exploded perspective view of an apparatus made in accordance with a first embodiment of the present invention, which is intended for commercial use.

Referring now to the drawings, wherein like reference numerals refer to like elements, a first embodiment of the apparatus of the present invention intended for commercial use, is shown in FIG. 1 and designated generally by the numeral 10. Apparatus 10 includes a base unit 12 supported on legs 14a, 14b and 14c. A rotatable shaft 16 is supported in the center of base unit 12 by braces 18a, 18b and 18c. A pulley 20 is mounted on shaft 16. Attached to the outside of base unit 12 is a 3-speed electric motor 22 having ⅜ horsepower. A pulley 24 is mounted on the drive shaft of motor 22. A belt 26 is placed around pulleys 20 and 24. In the embodiment shown in FIG. 1, the speed of the motor is reduced by means of different sized pulleys 20 and 24. These pulleys reduce the three speeds of motor 22 to 750 RPM, 1000 RPM and 1400 RPM. Any other suitable means such as gears could be used for speed reduction. An electrical control box 28 is also shown attached to the outside of the base unit 12. Control box 28 includes a switch for turning the motor 22 on and off and a second switch to change the speed of the motor. Preferably, the control box would include separate control buttons for different food types preset for specific speeds and for specific lengths of time.

Figure 2:
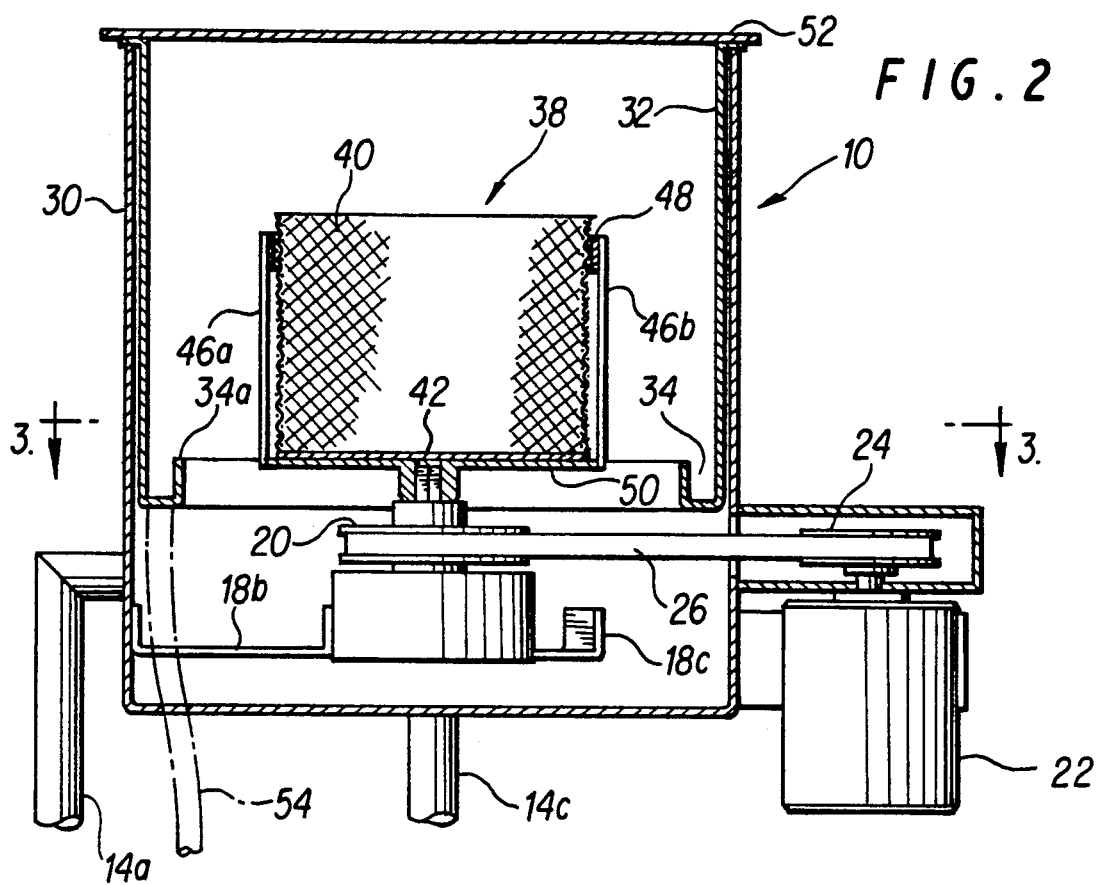
FIG. 2 is a side elevational view, partially broken away, of the apparatus shown in FIG. 1.

An outer housing 30 is mounted on base unit 12. A solid vertical wall 32 is mountable on and removable from apparatus 10. Solid vertical wall 32 has an annular channel or groove 34 on the inside of its lower edge so that the wall has a substantially J-shaped cross section as shown in FIGS. 1 and 2. Solid vertical wall 32 is mountable on apparatus 10 by inserting the wall in a downward vertical direction within outer housing 30. Solid vertical wall 32 is maintained at the proper height within apparatus 10 by means of tabs 36a, 36b and 36c which rest on top of the upper edge of wall 32. Alternatively, outer housing 30 could be eliminated and solid wall 32 could be mounted directly on base unit 12.

Apparatus 10 further includes a rotatable cylindrical basket, designated generally by the numeral 38, for holding the fried food products during operation of the apparatus. Basket 38 comprises a cylindrical piece of porous material 40 having its axis aligned in a vertical direction. The porous material must be sufficiently porous to permit oil which is separated from the fried food to pass through it readily. However, a sheet of material with perforations or slots therein would generally not be suitable because it would have too large of a surface area to collect oil which has been separated from the fried food. Any oil collected on the inside surface of piece 40 could be deposited back on the surface of the fried food. Moreover, after the apparatus has been used several times, a substantial amount of separated oil would tend to collect inside basket 38 if piece 40 is not sufficiently porous. A sheet of stainless steel having many perforations and very little metal surface area so that a major amount of its total surface area is perforated would be a suitable porous material. If it were sufficiently strong, a wire mesh could also be used. The upper end of cylindrical piece 40 is open. A solid circular piece 42 is disposed horizontally. The lower end of cylindrical piece 40 is closed by attaching the lower edge of cylindrical piece 40 to the outer edge of a solid circular piece 42 thereby forming basket 38. Basket 38 is caused to rotate by means of shaft 16. This can be done directly, for example, by attaching shaft 16 directly to the center of bottom piece 42 of basket 38. Alternatively, basket 38 can be coupled to shaft 16 by some means such as a cylindrically shaped frame having its axis aligned in a vertical direction, designated generally by the numeral 44. As shown, Frame 44 comprises four vertical rods 46a, 46b, 46c and 46d attached at their upper ends to circular wire 48 and at their lower ends to solid circular piece 50. Shaft 16 is attached directly to the center of circular piece 50 with the axis of the shaft 16 aligned with the axis of frame 44. Basket 38 is coupled to shaft 16 by inserting basket 38 in a downward vertical direction into frame 44 so that the axis of basket 38 is aligned with the axis of frame 44. Basket 38 is made to fit snugly within frame 44 so that basket 38 is held firmly in place during high speed rotation. Apparatus 10 further includes a solid removable cover such as circular lid 52 shown in the figures. Lid 52 is used to close the upper open end of solid wall 32, thereby enclosing basket 38 within apparatus 10. In an apparatus intended for commercial use, the major parts, such as base unit 12, housing 30, vertical wall 32, basket 38, frame 44 and lid 52, are preferably made of stainless steel.

In order to operate apparatus 10, fried food is placed into basket 38 which is then inserted vertically downward into frame 44. Solid vertical wall 32 is similarly inserted downward within outer housing 30 so that wall 32 surrounds basket 38. When wall 32 has been properly inserted, the height of circular bottom piece 42 of basket 38 relative to base unit 12 is greater than or equal to the height of the upper edge 34a of annular channel 34 of wall 32 relative to base unit 12, and the inner edge 34b of annular channel 34 is outside of and spaced apart from the outer edge of circular bottom piece 42 of basket 38. After both basket 38 containing the fried food product and wall 32 have been mounted on the apparatus, circular lid 52 is placed over the upper open end of wall 32 to enclose basket 38 within the apparatus. Motor 22 is then turned on and the proper speed for the fried food product in basket 38 is then selected using control box 28. Shaft 16 is caused to rotate at the proper speed by means of pulleys 20 and 24 and belt 26 which connect shaft 16 to the drive shaft of motor 22. While basket 38 is being rotated by shaft 16 at the proper speed, oil within the fried food product is separated from the food product by centrifugal force and then travels through porous piece 40 and against vertical wall 32. Separated oil then drips down vertical wall 32 and is collected in annular channel 34.

After basket 38 has been rotated for the proper length of time, motor 22 is turned off, lid 52 is removed from the top of wall 32, and basket 38 containing the food product is removed from frame 44 of the apparatus. The fried food product, which now contains less oil, is removed from the basket. After several baskets of fried food products have been rotated, a substantial amount of oil collects in annular channel 34 of wall 32. If it is desired to discard the collected oil, wall 32 is removed from the apparatus, the oil is then discarded, and wall 32 is mounted back in the apparatus. Alternatively, a tube 54 shown in phantom in FIG. 2 can be attached to a hole (not shown) in the bottom of annular channel 34 so that the collected oil can simply drain from the apparatus during heavy commercial use. Once the oil has drained out of the apparatus, it can be reused for cooking.

Figure 4:
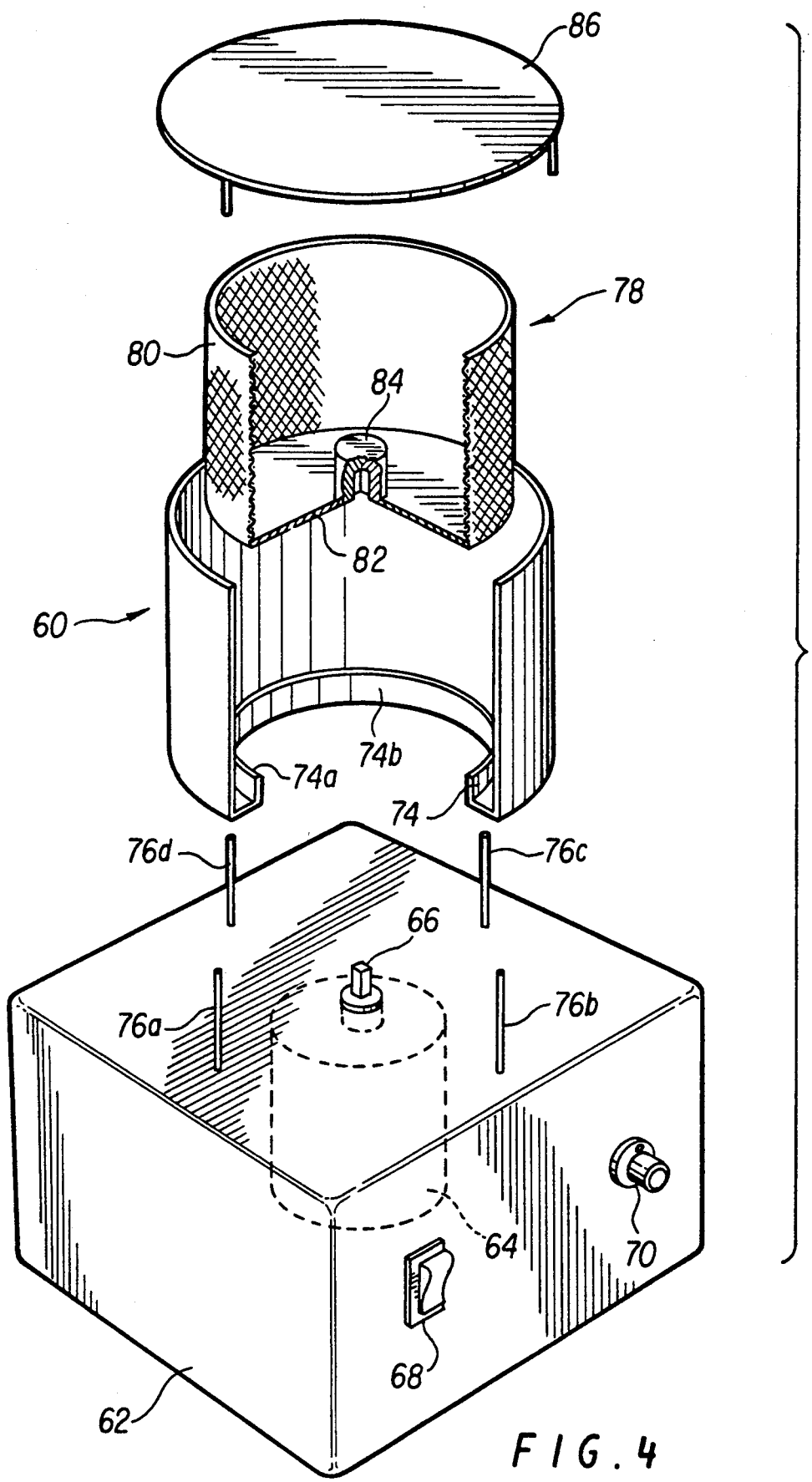
FIG. 4 is an exploded perspective view of an apparatus made in accordance with a second embodiment of the present invention, which is intended for home use.

A second embodiment of the apparatus of the present invention intended for home use is shown in FIG. 4 and designated generally by the number 60. Apparatus 60 includes a base unit 62 containing an electric motor 64. The drive shaft 66 of motor 64 extends vertically from base unit 62. The motor can be turned on and off and the speed of the motor can be selected using standard switches shown as 68 and 70. A solid vertical wall 72 is mountable on and removable from apparatus 60. Vertical wall 72 has an annular channel 74 on the inside of its lower edge so that the wall has a substantially J-shaped cross section as shown in FIG. 4. Vertical wall 72 is mountable on apparatus 60 by inserting the wall in a downward vertical direction between pins 76a, 76b, 76c and 76d which extend vertically from the top surface of base unit 62. Vertical wall 72 fits snugly within the pins and sits on the top surface of base unit 62.

Apparatus 60 further includes a rotatable cylindrical basket, designated generally by the numeral 78, for holding the fried food products during operation of the apparatus. Basket 78 comprises a cylindrical piece of porous material 80 having its axis aligned in a vertical direction. The upper end of cylindrical piece 80 is open. The lower end of cylindrical piece 80 is closed by attaching the lower edge of cylindrical piece 80 to the outer edge of a solid circular piece 82 which is horizontally disposed. Basket 78 is caused to rotate by coupling it to shaft 66 of motor 64. A coupling unit 84 is located in the center of circular piece 82. Coupling unit 84 fits snugly over shaft 66 so that basket 78 is firmly connected to shaft 66 during high speed rotation. Apparatus 60 further includes a solid removable cover such as circular lid 86. Lid 86 is used to close the open end of wall 72 thereby enclosing basket 78 within the apparatus. In an apparatus intended for home use, the major parts could be made of any suitable material such as plastic or stainless steel.

In order to operate apparatus 60 shown in FIG. 4, fried food is placed into basket 78 which is then inserted vertically downward so that the axis of basket 78 is aligned with shaft 66. Coupling unit 84 is then mounted firmly on the top of shaft 66. When wall 72 and basket 78 have been properly mounted on apparatus 60, the height of circular bottom piece 82 of basket 78 relative to base unit 62 is greater than or equal to the height of the upper edge 74a of annular channel 74 of wall 72 relative to base unit 62, and the inner edge 74b of annular channel 74 is outside of and spaced apart from the outer edge of circular bottom piece 82 of basket 78. After both basket 78 containing the fried food product and wall 72 have been mounted on apparatus 60, circular lid 86 is placed over the upper open end of wall 72 to enclose basket 78 within the apparatus. Motor 64 is then turned on using switch 68 and the proper speed for the fried food product in basket 78 selected using control 70. While basket 78 is being caused to rotate at the proper speed by shaft 66, oil within the fried food product is separated from the centrifugal force and travels through porous piece 80 and against vertical wall 72. The separated oil then drips down wall 72 and is collected in annular channel 74.

Figure 3:
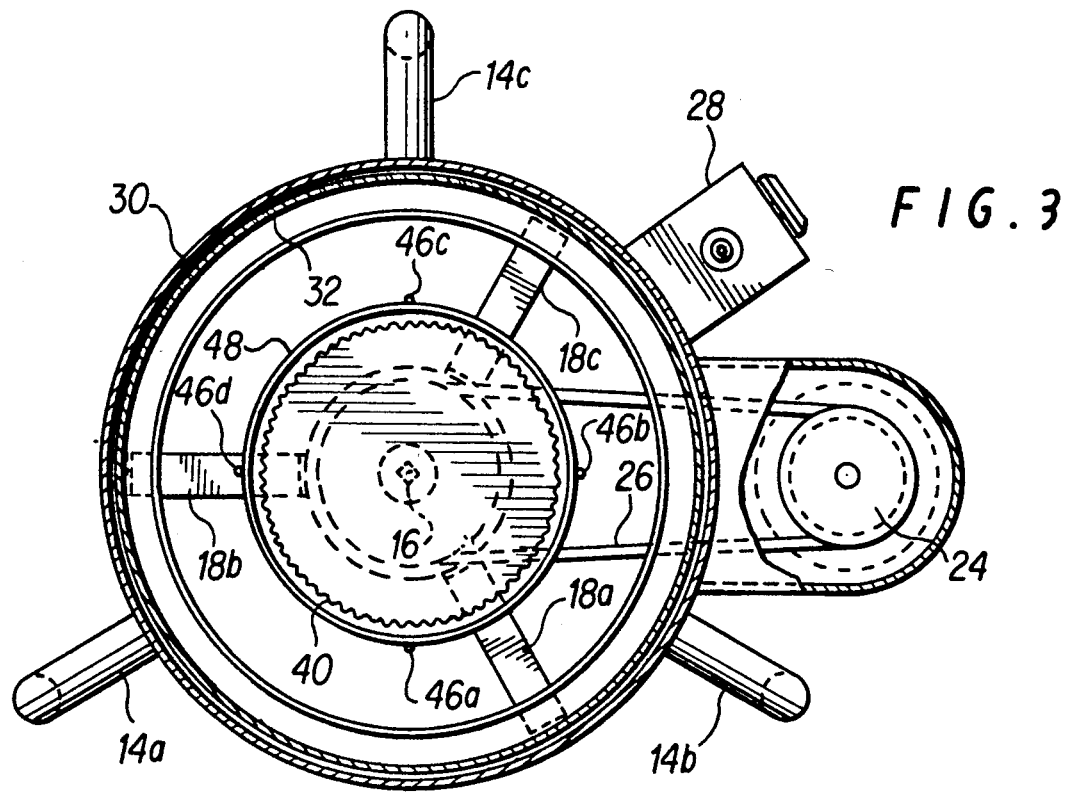
FIG. 3 is a top plan view, partially broken away, of the apparatus shown in FIG. 1.

Following rotation of basket 78 for the proper length of time, motor 64 is turned off and lid 86 is removed from the top of wall 72. The food product is then removed from within basket 78. After several baskets of fried foods have been processed using apparatus 60, a substantial amount of oil collects in annular channel 74. To discard the collected oil, wall 72 is vertically removed from the apparatus, the oil is then discarded or collected for reuse, and wall 72 is mounted back on the apparatus. In both apparatus 10 shown in FIG. 1-3 and apparatus 60 shown in FIG. 4, it is particularly advantageous to be able to independently mount and remove either the basket for containing the fried food or the vertical wall with annular channel for collecting the separated oil without having to remove and remount the other piece. This feature also makes cleaning of the apparatus particularly easy after use.

In accordance with the process of the present invention, the fat content of fried food products can be significantly reduced by subjecting foods which have been fried, and which are at a temperature such that any oil or fat in or on the food product has not hardened, to centrifugal forces in order to separate oil from the food product. Since not all fried food products have the same characteristics or are fried in the same manner, different types of fried food products must be processed under different conditions. If a fried food product is subjected to centrifugal forces at very high speeds, the food product will be damaged and may even break apart in certain cases. For example, if the speed is too high, parts of fried chicken including the skin will break off. Fried fish is very delicate. If it is subjected to high speed centrifugal forces, the fish will simply break apart. On the other hand, if a particular food product is processed at a speed which is too low, then the oil will not separate out and will remain in the product.

In the case of fried vegetables such as French fried potatoes, it has been determined that the fried vegetables should be placed in a sufficiently porous container, such as that shown in the figures hereto, and subjected to centrifugal force by rotating the container at a speed in the range of about 1120 RPM to about 1470 RPM for a period of about 45 seconds to about 60 seconds. In the case of fried meats, such as fried chicken or hamburger, the container should be rotated at a speed in the range of about 800 RPM to about 1050 RPM for a period of from about 45 seconds to about 60 seconds. And in the case of fried fish, the container should be rotated at a speed in the range of from about 600 RPM to about 788 RPM for a period of from about 45 seconds to about 60 seconds.

When fried food products are subjected to centrifugal force in accordance with the process of the present invention, it has been found that the fat content of fried food products can be reduced by about 15 percent to about 40 percent by weight. The process has been found to be so effective that, not only oil from the surface of the food product is separated out, but also oil within the food product itself. For example, when fried chicken was subjected to the present process, oil was removed from the surface of the fried chicken. However, when the skin of the fried chicken was removed, oil normally found under the skin had also been removed and mostly water appeared to remain under the skin.

EXAMPLE 1

Approximately 1 lb. of French fried potatoes were deep fried in a blend of vegetable and animal oil at a temperature of about 350° F. Approximately half of the cooked potatoes were then placed in the basked to an apparatus such as that shown in FIG. 1. The French fried potatoes were then subjected to centrifugal force by rotating the basket at a speed of about 1400 RPM for a period of about 60 seconds. The half of the French fried potatoes which had not been processed in accordance with the present invention and the half which had been processed were then both tested to determine their respective characteristics. The following results were obtained:

| Parameters | Unprocessed French Fries | Processed French Fries | Percent Difference |
|---|---|---|---|
| Percent Fat | 24.3 | 15.5 | −36.2 |
| Percent Protein | 2.9 | 3.3 | 13.8 |
| Percent Total Carbohyrates | 41.1 | 46.4 | 12.9 |
| Percent Moisture | 30.0 | 32.9 | 9.7 |
| Percent Ash | 1.6 | 1.8 | 12.5 |
| Percent Crude Fiber | 0.11 | 0.11 | −9.1 |
| Percent Salt | 0.032 | 0.048 | 50.0 |
| Calories per 100 Grams | 395 | 338 | −14.4 |

EXAMPLE 2

Two hamburger patties, each weighing approximately 0.25 lb., were fried on a flat grill at a temperature of about 350° F. One of the hamburger patties was then placed in the basket of an apparatus such as that shown in FIG. 1 and then subjected to centrifugal force by rotating the basket at a speed of about 1000 RPM for a period of about 60 seconds. The fried hamburger patty which had not been processed and the fried hamburger patty which had been processed were then both tested to determine their respective characteristics. The following results were obtained:

| Parameters | Unprocessed Hamburger | Processed Hamburger | Percent Difference |
|---|---|---|---|
| Percent Fat | 22.3 | 15.3 | −31.4 |
| Percent Protein | 23.2 | 24.8 | 6.9 |
| Percent Total Carbohydrates | 1.5 | 2.9 | 93.3 |
| Percent Moisture | 51.7 | 55.4 | 7.2 |
| Percent Ash | 1.3 | 1.6 | 23.1 |
| Percent Crude Fiber | 0.04 | 0.04 | 0.0 |
| Percent Salt | 0.103 | 0.115 | 11.7 |
| Calories per 100 Grams | 300 | 249 | −17.0 |

EXAMPLE 3

A whole chicken was cut in half and then each half was cut into pieces. The pieces in both halves were dipped in a batter of flour and water and then deep fried in a blend of vegetable and animal oil at a temperature of about 350° F. The fried pieces from one half of the chicken were placed in the basket of an apparatus such as that shown in FIG. 1 and then subjected to centrifugal force by rotating the basket at a speed of about 1000 RPM for a period of about 60 seconds. The half of the fried chicken which had not been processed and the half which had been processed were then both tested to determine their respective characteristics. The following results were obtained:

| Parameters | Unprocessed Chicken | Processed Chicken | Percent Difference |
|---|---|---|---|
| Percent Fat | 23.5 | 16.8 | −28.5 |
| Percent Protein | 21.3 | 22.8 | 7.0 |
| Percent Total Carbohydrates | 15.7 | 13.2 | 15.9 |
| Percent Moisture | 38.0 | 45.5 | 19.7 |
| Percent Ash | 1.4 | 1.6 | 14.3 |
| Percent Crude Fiber | 0.10 | 0.08 | −20.0 |
| Percent Salt | 0.048 | 0.049 | 2.1 |
| Calories per 100 Grams | 360 | 295 | −18.1 |

EXAMPLE 4

Two pieces of catfish, each weighing approximately 0.5 lb., were dipped in a batter of flour and water and then deep fried in a blend of vegetable and animal oil at a temperature of about 350° F. One of the fried pieces of fish was placed in the basket of an apparatus such as that shown in FIG. 1 and then subjected to centrifugal force by rotating the basket at a speed of about 750 RPM for a period of about 60 seconds. The piece of fried fish which had not been processed and the piece which had been processed were then both tested to determine their respective characteristics. The following results were obtained:

| Parameters | Unprocessed Fish | Processed Fish | Percent Difference |
|---|---|---|---|
| Percent Fat | 19.6 | 13.8 | −29.6 |
| Percent Protein | 15.5 | 16.3 | 5.2 |
| Percent Total Carbohydrates | 11.7 | 14.4 | 23.1 |
| Percent Moisture | 53.2 | 53.6 | 0.8 |
| Percent Ash | 1.6 | 1.8 | 12.5 |
| Percent Crude Fiber | 0.12 | 0.12 | 0.0 |
| Percent Salt | 0.057 | 0.058 | 1.8 |
| Calories per 100 Grams | 278 | 247 | −11.2 |

EXAMPLE 5

A whole chicken was cut in half. One half of the chicken was baked. The other half was cut into pieces which were then dipped in a batter of flour and water and then deep fried in a blend of vegetable and animal oil at a temperature of about 350° F. The pieces of fried chicken were then placed in the basket of an apparatus such as that shown in FIG. 1 and subjected to centrifugal force by rotating the basket at a speed of about 1000 RPM for a period of about 60 seconds. The half of the chicken that had been baked and the half of the chicken that had been fried and then processed in accordance with the present invention were both tested to determine their respective fat contents. Between the time that the baked half had been baked and the time that it was tested, oil dripped from the baked chicken. The oil which dripped was weighed. The fat content of the baked chicken both with the oil which had dripped out and without that oil were determined. The following test results were obtained:

| Product Tested | Percent Fat |
|---|---|
| Processed Fried Chicken | 20.8 |
| Baked Chicken Without Oil | 20.4 |
| Baked Chicken With Oil | 22.2 |

Baked chicken is generally considered to have less fat content than fried chicken. However, the above test results show that fried chicken processed in accordance with the present invention contains less fat than the baked chicken with the oil which was in the chicken after it was removed from the oven and which only dripped out during the time when the baked chicken was being transported to the testing laboratory.

It is believed that the reason that the processed fried chicken had less fat content than the baked chicken as it came out of the oven is that the process of the present invention not only separates oil out from the surface of the fried chicken but also out from the chicken itself.

What is claimed is:

1. An apparatus for reducing the fat content of fried foods, said apparatus comprising:
   (a) a base unit for supporting said apparatus,
   (b) a rotatable shaft extending vertically from said base unit,
   (c) a means for rotating said shaft,
   (d) a rotatable cylindrical basket capable of holding said fried foods, said basket comprising a horizontally disposed circular bottom piece and a vertically disposed cylindrical piece of porous material being attached at its lower open end to the outer edge of said circular bottom piece to form the porous vertical wall of said basket, wherein said basket is vertically connectible to and removable from said rotatable shaft and said porous material is sufficiently porous to permit oil from fried food to pass through it readily,
   (e) a means for coupling said rotatable shaft to said rotatable basket so that the axis of said shaft is aligned with the axis of said basket,
   (f) a solid vertical wall surrounding the porous vertical wall of said rotatable basket, said solid vertical wall having an annular channel on the inside of its lower edge so that it has a substantially J-shaped cross section, wherein said solid vertical wall is vertically mountable on and removable from said apparatus so that the height of the circular bottom piece of said basket relative to said base unit is greater than or equal to the height of the upper edge of the annular channel of said solid vertical wall relative to said base unit and the inner edge of said annular channel is spaced apart from and outside of the outer edge of the circular bottom piece of said basket, and
   (g) a solid removable lid for closing the upper open end of said solid vertical wall and enclosing said basket within said apparatus.

2. The apparatus of claim 1 wherein the rotatable shaft is coupled to said rotatable basket by means of a vertically disposed, cylindrically shaped frame attached to said shaft so that the axis of said shaft is aligned with the axis of said frame.

3. An apparatus of claim 1 wherein said shaft is coupled directly to said rotatable basket.

4. The apparatus of claim 1 wherein said solid vertical wall is mountable on and removable from a housing surrounding said solid vertical wall and attached to said base unit.

5. The apparatus of claim 1 wherein said solid vertical wall is directly mountable on and removable from said base unit.

6. The apparatus of claim 1 wherein said porous material is a perforated sheet of stainless steel having a major amount of its surface area perforated.

7. The apparatus of claim 1 wherein the means for rotating said shaft is capable of rotating said shaft at speeds between about 600 RPM and about 1500 RPM.

* * * * *